United States Patent
Sugumar et al.

(10) Patent No.: US 10,117,196 B2
(45) Date of Patent: Oct. 30, 2018

(54) DYNAMICALLY CONFIGURABLE APPARATUS FOR OPERATING WITHIN THE CURRENT CAPABILITIES OF THE POWER SOURCE

(71) Applicant: QUALCOMM Incorporated, San Diego, CA (US)

(72) Inventors: Suresh Sugumar, Leedon Heights (SG); Trang Kim Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 14/836,793

(22) Filed: Aug. 26, 2015

(65) Prior Publication Data
US 2017/0064650 A1    Mar. 2, 2017

(51) Int. Cl.
*G06F 1/32* (2006.01)
*H04W 52/38* (2009.01)
*H04W 52/02* (2009.01)

(52) U.S. Cl.
CPC .......... *H04W 52/38* (2013.01); *G06F 1/3243* (2013.01); *H04W 52/028* (2013.01); *H04W 52/0277* (2013.01); *Y02D 70/1262* (2018.01); *Y02D 70/142* (2018.01); *Y02D 70/144* (2018.01); *Y02D 70/146* (2018.01)

(58) Field of Classification Search
CPC ........ G06F 1/3243; G06F 1/3278; G06F 1/26; H04W 52/0261
See application file for complete search history.

(56) References Cited

U.S. PATENT DOCUMENTS

| | | | |
|---|---|---|---|
| 7,197,656 B2 | 3/2007 | Nguyen et al. | |
| 8,473,761 B2 | 6/2013 | Rathi et al. | |
| 8,510,582 B2 | 8/2013 | Naffziger et al. | |
| 2010/0216524 A1 | 8/2010 | Thomas et al. | |
| 2011/0093733 A1* | 4/2011 | Kruglick | G06F 1/3203 713/340 |
| 2012/0216064 A1* | 8/2012 | Ko | G06F 1/3206 713/324 |
| 2013/0045744 A1* | 2/2013 | Dimpflmaier | H04W 36/14 455/437 |
| 2013/0254579 A1 | 9/2013 | Derbyshire et al. | |
| 2013/0283026 A1 | 10/2013 | Wells et al. | |
| 2014/0111030 A1* | 4/2014 | Chou | G05F 1/10 307/130 |

(Continued)

FOREIGN PATENT DOCUMENTS

WO    2013060802 A1    5/2013

OTHER PUBLICATIONS

International Search Report and Written Opinion—PCT/US2016/041780—ISA/EPO—dated Oct. 4, 2016.

*Primary Examiner* — Albert Wang
(74) *Attorney, Agent, or Firm* — Arent Fox, LLP and Qualccomm (57) ABSTRACT

Aspects of an apparatus are disclosed. The apparatus is configured to receive power from any number of power sources. The apparatus includes a load and a power management. The power management circuit is configured to manage power supplied by the power source to the load. The load is dynamically configurable to operate within the current capability of the power source.

21 Claims, 7 Drawing Sheets

(56) References Cited

U.S. PATENT DOCUMENTS

| | | | | |
|---|---|---|---|---|
| 2014/0148227 A1* | 5/2014 | Choi | ............... | H04W 52/0251 |
| | | | | 455/574 |
| 2014/0157021 A1* | 6/2014 | Varma | ............... | G06F 1/3234 |
| | | | | 713/321 |
| 2014/0304528 A1 | 10/2014 | Huang et al. | | |
| 2015/0103953 A1* | 4/2015 | Lee | ............... | H04W 52/0251 |
| | | | | 375/297 |
| 2016/0299551 A1* | 10/2016 | Wu | ............... | G06F 1/3212 |

* cited by examiner

DYNAMICALLY CONFIGURABLE APPARATUS FOR OPERATING WITHIN THE CURRENT CAPABILITIES OF THE POWER SOURCE

BACKGROUND

Field

The disclosure relates generally to electronic apparatuses, in particular, to dynamically configurable apparatus for operating within the current capabilities of the power source.

Background

Increasingly, current management is becoming an issue for mobile devices such as wireless communication devices. Wireless communication technologies and devices (e.g., cellular phones, wireless communication attachments for laptops, etc.) have grown in popularity and uses over the past several years. This is due, at least in part, to improvements in performance and capability that allow users to execute complex and power intensive software applications (e.g., music players, web browsers, video streaming applications, etc.). To meet the increasing performance demand, power consumptions (e.g., current draws) of these wireless communication devices have likewise increased.

Moreover, these wireless communication devices may be configured to connect and to receive power from multiple types of power resources. For example, a wireless communication device may be connected to and received power from a laptop via one of various types of Universal Serial Bus (USB) connections. The current consumption of the wireless communication device would need to meet the restraint of the one USB type. Thus, one design challenge is to manage the current consumption of a wireless communication device for multiple types of power sources with different current supply limitations.

SUMMARY

Aspects of an apparatus are disclosed. The apparatus includes a load, and a power management circuit configured to manage power supplied by a power source to the load and provide to the load one or more parameters relating to the power source. The load is dynamically configurable to operate within a current capability of the power source based on the one or more parameters.

Further aspects of an apparatus are disclosed. The apparatus includes a load, and a power management circuit configured to manage power supplied by a power source to the load. The load is dynamically configurable to operate within a current capability of the power source by applying one or more current limiting schemes.

Additional aspects of an apparatus are disclosed. The apparatus includes a load, and a power management circuit configured to manage power supplied by a power source to the load. The load is dynamically configurable to limit current drawn from the power source based on a current capability of the power source.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term "apparatus" shall be construed to include any integrated circuit or system, or any portion of an integrated circuit or system (e.g., modules, components, circuits, or the like residing in an integrated circuit or part of an integrated circuit). The term "apparatus" shall also be construed to extend to any intermediate product where an integrated circuit or system is combined with other integrated circuits or systems (e.g., a video card, a motherboard, etc.) or any end product (e.g., mobile phone, smart phone, personal digital assistant (PDA), tablet computer, laptop computer, game console, media player, digital camera, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements. An indirect connection encompasses the presence of one or more intermediate elements between two elements that are "connected" or "coupled" together. In contrast, when a connection or coupling is referred to as being a "direct" connection or coupling, there are no intervening elements present.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, terminology of the form "at least one of A, B, or C" used in the description or the claims means A or B or C or any combination thereof.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatus and methods for applying current limiting schemes will be presented in the context of a wireless communication device. However, as those skilled in the art will readily appreciate, the various aspects of current limiting schemes presented throughout this disclosure are not limited thereto. Accordingly, all references to a specific application or a wireless communication device are intended only to illustrate exemplary aspects of current limiting schemes with the understanding that such aspects may have a wide range of applications.

Figure 1:
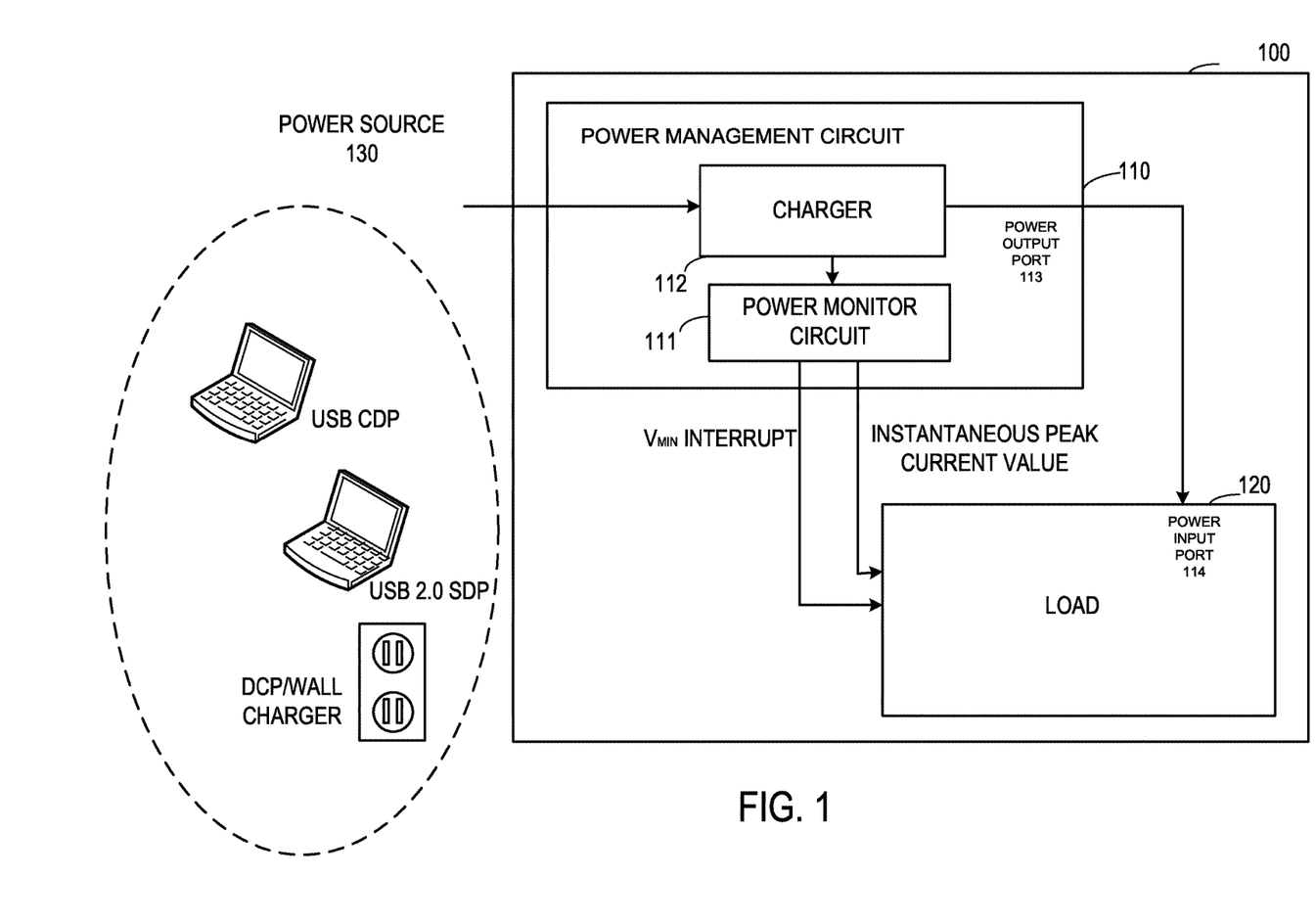
FIG. 1 is a block diagram of an exemplary embodiment of a wireless communication device configured to receive power from multiple types of power sources.

FIG. 1 is a block diagram of an exemplary embodiment of a wireless communication device configured to receive power from multiple types of power sources. The wireless communication device 100 may be a mobile phone, a smart phone, a personal digital assistant (PDA), a tablet computer, a laptop computer, a game console, a media player, a digital camera, or any other suitable device. The wireless device may be configured to support any suitable multiple access technology, including by way of example, Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access technologies. The wireless communication device 100 may be further configured to support any suitable air interface standard, including by way of example, Long Term Evolution (LTE), Evolution-Data Optimized (EV-DO), Ultra Mobile Broadband (UMB), Universal Terrestrial Radio Access (UTRA), Global System for Mobile Communications (GSM), Evolved UTRA (E-UTRA), IEEE 802.11 (Wi-Fi), IEEE 802.16 (WiMAX), IEEE 802.20, Flash-OFDM, Bluetooth, or any other suitable air interface standard. The actual air interface standard and the multiple access technology supported by the wireless communication device 100 will depend on the specific application and the overall design constraints imposed on the system.

The wireless communication device 100 includes a power management circuit 110 configured to receive power supplied from a power source 130. The wireless communication device 100 may be configured to receive power from different power sources. These power sources may include, for example, a USB charging downstream port (CDP), which may allow a current draw of up to 1000 mA. The power sources may further include, for example, a USB standard charging port (SCP), which may allow a current draw of up to 500 mA. The power sources may further include, for example, a dedicated charging port (DCP), which allows a current draw of up to 1500 mA. The DCP may be utilized when a USB connector is connected to a wall charger. As described, the power sources have different current supply limitations.

The power management circuit 110 may be configured to manage power supplied from the power source 130 to a load 120. In the exemplary embodiment, the power management circuit 110 includes the charger 112 (e.g., a linear charger) which receives power supplied from the power source 130 (e.g., one of the various USB ports described above) and provides a regulated or constant voltage to the load 120. The voltage may be provided from the power management circuit 110 via power output port 113 and received by the load 120 via power input port 114.

The power management circuit 110 may include a power monitor circuit 111 that monitors the power supplied to the load 120. The power monitor circuit 111 may be configured to provide to the load 120 one or more parameters relating to the power source 130. As will be explained in greater detail, the load 120 may be dynamically configurable to operate within the current capability of the power source 130 based on the one or more parameters.

The one or more parameters may include, by way of example, a value for the instantaneous peak current drawn by the load 120. If the current capability of the power source 130 is known, the load 120 can use this parameter to configure itself such that it does not exceed the maximum current limit using various levels of current limiting schemes by making the correct tradeoffs with respect to performance, bandwidth, etc. The current capability of the power source 130 may be determined, in some cases, from the type of power source, which may be communicated through one of the pins on the connector between the power source 130 and the wireless communication device 100, or by other suitable means known in the art. By way of example, a USB SDP connection from a PC is known to have a maximum current of 500 mA. The instantaneous peak current may be measured by the power monitor circuit 111 and the measured value output from the power management circuit 110 to the load 120.

The one or more parameters may also include, for example, a voltage indicator. The voltage indicator may be a status bit that is set when the power monitor circuit 111 detects that the voltage from the power source 130 is beginning to droop due to excess current draw. The status bit may take the form of an interrupt ($V_{MIN}$ INTERRUPT) that is sent from the power monitor circuit 111 to the load 120. The interrupt may be useful when the current capability of the power source 130 is unknown. In this case, the load 120 can read the instantaneous peak current value when it receives the interrupt and then apply various current limiting schemes to stay under the instantaneous peak current budget.

The various instantaneous peak current value and voltage indicator discussed above are examples of parameters that may be generated by the power management circuit 110 and used by the load 120 to dynamically configure itself for operation within the current capability of the power source 130. However, as those skilled in the art will readily appreciate, other parameters may be appropriate depending on the particular application and the overall design constraints imposed on the apparatus.

Figure 2:
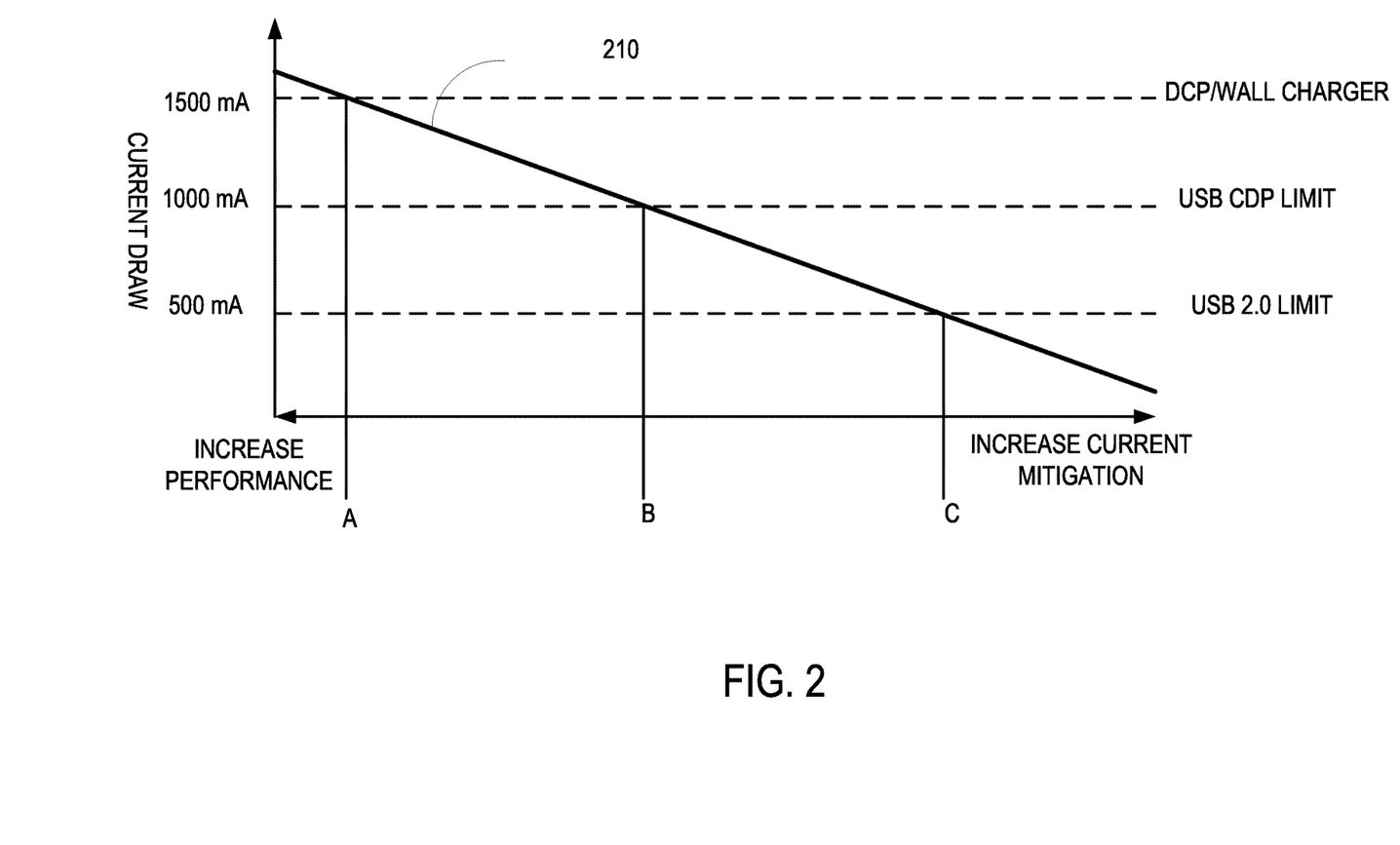
FIG. 2 is a power diagram illustrating various current draws for an exemplary embodiment of a wireless communication device.

FIG. 2 is a power diagram illustrating various current draws for an exemplary embodiment of a wireless communication device. The diagram plots current draw to performance levels for the wireless communication device. Referring to FIGS. 1 and 2, the current limiting scheme applied by the load 120 may adjust or limit the current draw by adjusting the performance level. In this fashion, the load 120 may operate at a current consumption level meeting the current supply limit of the power source 130. Line 210 indicates that as the current limiting scheme increases the current mitigation level (e.g., decreasing performance level of the wireless communication device), the wireless communication device 100 may draw less current. Conversely, as the current limiting scheme decreases the current mitigation level (e.g., increasing performance level of the wireless communication device), the wireless communication device 100 may draw more current. For example, in the case of a DCP power source 130, the current limiting scheme may target the current mitigation level/performance level at point A to meet the current supply limit of 1500 mA. In the case of a CDP power source, the current limiting scheme may target the current mitigation level/performance level at point B to meet the current supply limit of 1000 mA. In a case of an SDP power source, the current limiting scheme may target the current mitigation level/performance level at point C to meet the current supply limit of 500 mA.

Figure 3:
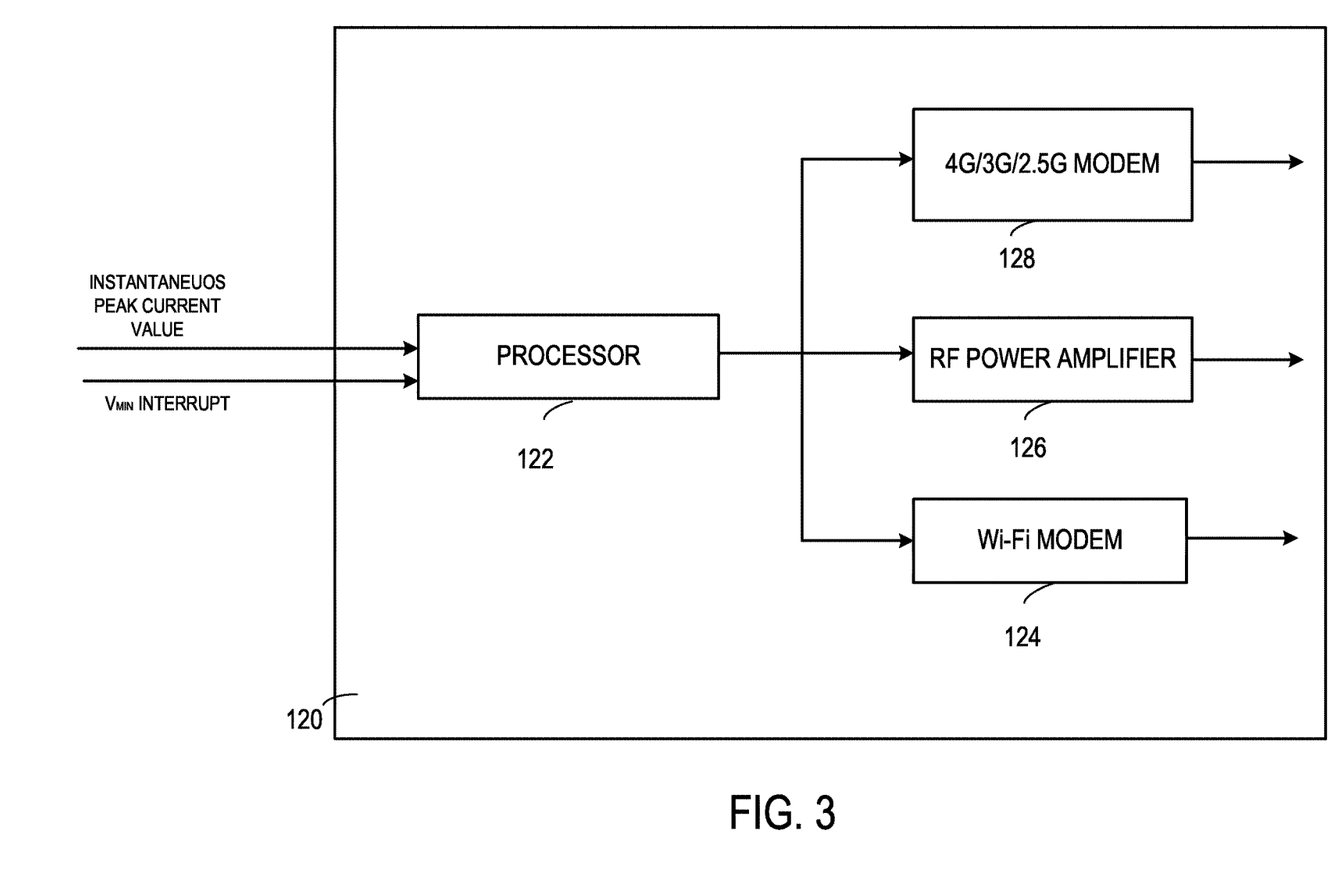
FIG. 3 is a functional block diagram of an exemplary embodiment of a load applying various current limiting schemes.

FIG. 3 is a functional block diagram of an exemplary embodiment of a load applying various current limiting schemes. The load 120 may include any number of modules and/or components. By way of example, the load 120 may include multiple wireless transceivers, such as a 4G/3G/2.5G modem 128 to support LTE communications and a Wi-Fi modem 124 to support Wi-Fi communications. For example, the 4G/3G/2.5G modem 128 may be able to perform data communication using one or more of the 4G/3G/2.5G protocols. The load 120 may also include an amplifier, such as an RF power amplifier 126 to support RF communications. The load 120 may also include other modules, components, additional amplifiers and/or circuits that are not shown.

The load 120 may further include a processor 122. The processor 122 may be a single core or multiple core processor capable of managing the operations of the load 120, as well as dynamically configuring the load 120 to operate within the current capability of the power source. The processor 122 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more of the general-purpose and/or special-purpose processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The processor 122 may be implemented apart from the various modules or components, integrated into one of the modules or components, or distributed across any number of the modules or components.

In the exemplary embodiment, the processor 122 may apply the current limiting scheme, based on one or more parameters from the power management circuit 110 (see FIG. 1). The current limiting scheme may lower the performance level (e.g., increase the current mitigation) of the wireless communication device 120 and thereby reduce the current draw. For example, the application of the current limiting scheme may cause the processor 122 may reduce its operations by lowering its operating frequency, lowering its operating voltage, and/or power-collapsing or hot-plugging its cores. Hot-plugging is an operation to power-collapse a core and to inform the operating system (OS) (e.g., hide the power-collapsed core) such that the OS does not attempt to wake up the power-collapsed core.

The processor 122 may apply the current limiting scheme to the Wi-Fi modem 124 by reducing its bandwidth and/or output power. For example, the Wi-Fi modem 124 may reduce its transmission/receiving signal bandwidth, reduce transmission power, thereby reducing its operating range, and/or reduce the number of Wi-Fi clients. The processor 122 may apply the current limiting scheme to the RF power amplifier 126 by reducing its power, which reduces its operating range. The processor 122 may apply the current limiting scheme to the 4G/3G/2.5G modem 128 by reducing its bandwidth and/or changing its communication mode. For example, the 4G/3G/2.5G modem 128 may lower its operation from 4G LTE, Category 4 to 4G LTE, Category 3, 2, or 1. The 4G/3G/2.5G modem 128 may drop from 4G LTE to 3G or 2G for wireless communication. Furthermore, the 4G/3G/2.5G modem 128 may disable certain features of LTE, such as carrier aggregation. Various other current limiting schemes may be employed in different embodiments depending on the particular application and the overall design constraints imposed on the apparatus.

Figure 4:
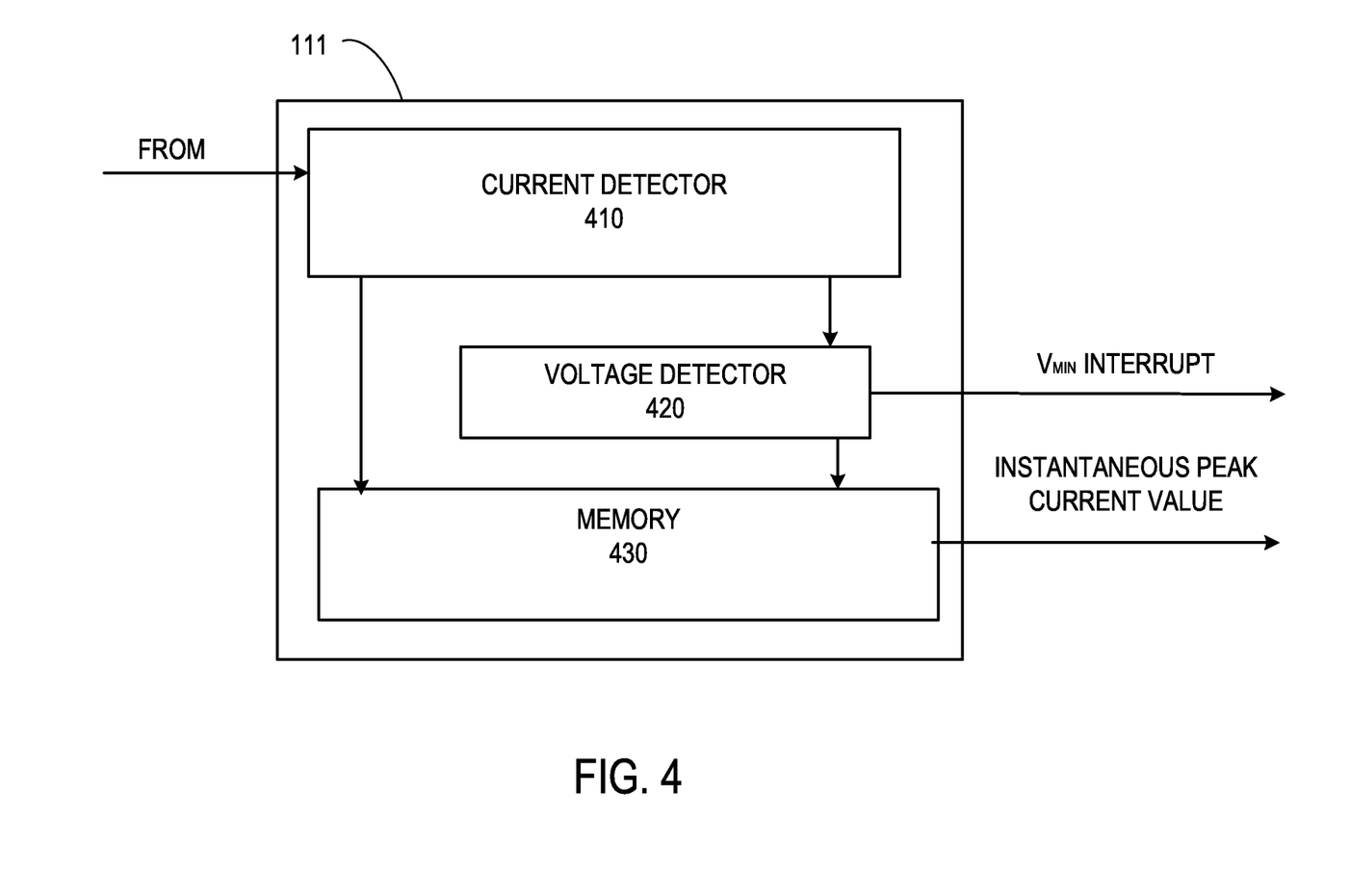
FIG. 4 is a functional block diagram of an exemplary embodiment of a power monitor circuit.

FIG. 4 is a functional block diagram of an exemplary embodiment of a power monitor circuit. In this embodiment, the power monitor circuit 111 includes a current detector 410 and a voltage detector 420.

The current detector 410 may be used to measure the instantaneous peak current provided by the power source as seen by the power monitor circuit 111. The measured instantaneous peak current may then be used to provide a value to the load 120 representing the current draw by the load 120 to support operations (see FIG. 1). As explained earlier, this value may be used by the load 120 to apply various current limiting schemes to ensure that the load 120 maintains operation within the current capability of the power source 130 (see FIG. 1).

The voltage detector 420 may be used to monitor the voltage output from the power source 130 (see FIG. 1). In this embodiment, the voltage detector 420 may be used to generate a voltage indicator for the load 120 (see FIG. 1). The voltage indicator may be a status bit that is set when the voltage begins to droop due to excessive current draw from the power source 130 (see FIG. 1). As described earlier, the status bit may take the form of an interrupt ($V_{MIN}$ INTERRUPT) that is sent from the power monitor circuit 111 to the load 120 (see FIG. 1). When the interrupt is received, the load 120 can read the instantaneous peak current value and then apply various current limiting schemes to stay under the instantaneous peak current budget (see FIG. 1). The power monitor circuit 111 may further be configured to store the instantaneous peak current value in memory 430 when the status bit is set. This allows the load 120 to continuously access the value while applying various current limiting schemes to stay under the instantaneous peak current budget (see FIG. 1).

Figure 5A:
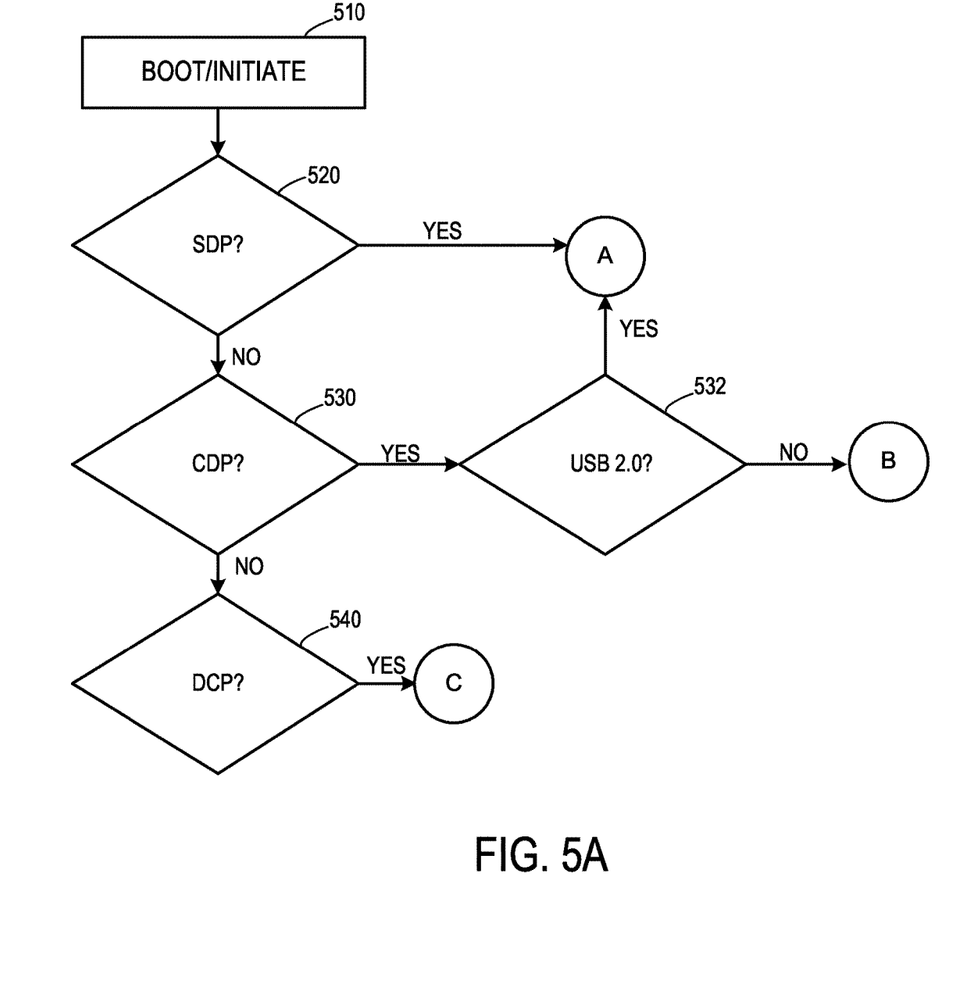
FIGS. 5A and 5B depict a flow diagram illustrating the operation of an exemplary embodiment of a load applying a current limiting scheme.
Figure 5B:
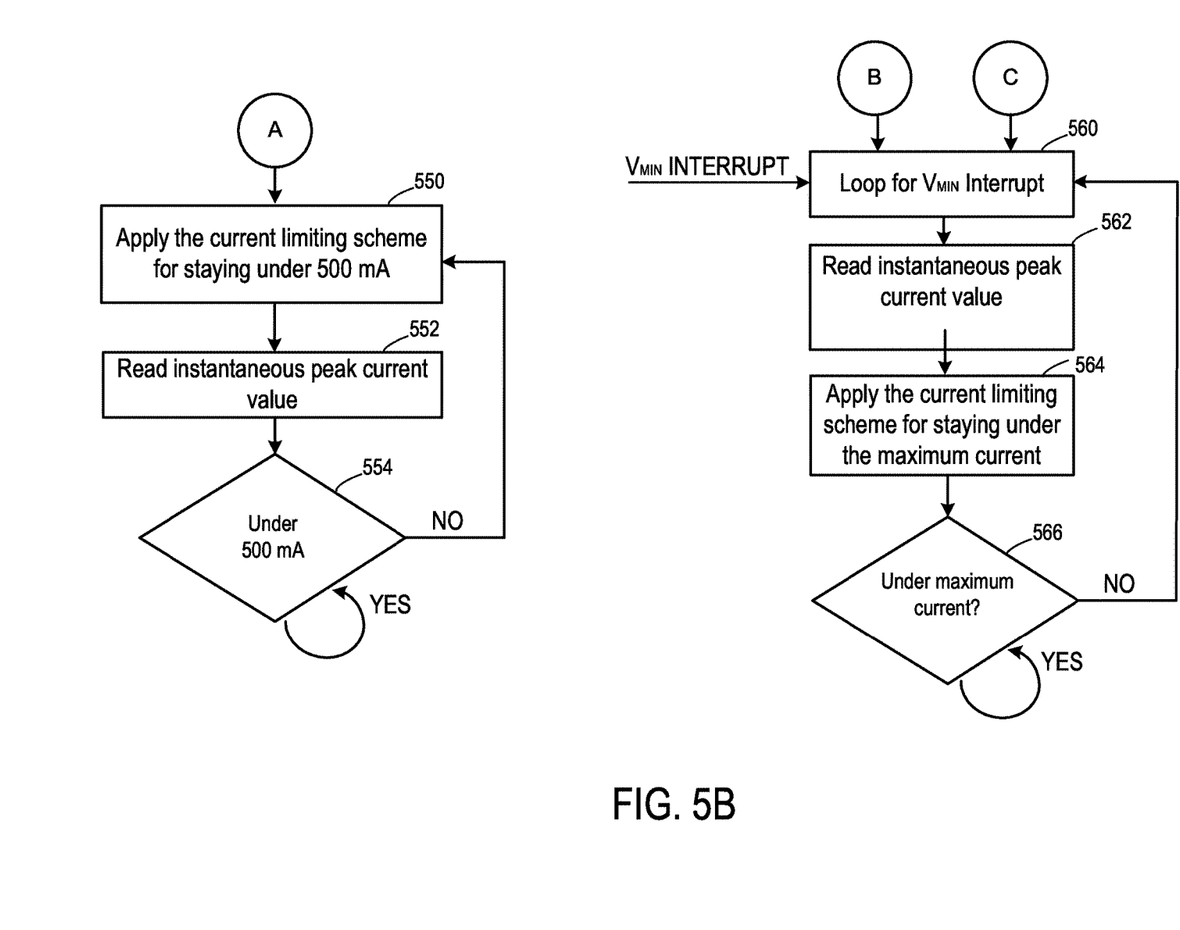

FIGS. 5A and 5B depict a flow diagram illustrating the operation of an exemplary embodiment of a load applying a current limiting scheme. The operation illustrated in FIGS. 5A and 5B begins by identifying the type of power source, for example, during a boot or initializing sequence. In this embodiment, the power source options are PC DSP port, PC CDP port, or wall charger. Other embodiments may be implemented for handling other power sources, either instead of or in addition to, any of the aforementioned power sources. The power source may be identified through a signal on one or more pins for the connector between the power source 130 and the power management circuit 110, or by any other suitable means known in the art (see FIG. 1). By way of example, a voltage or an absence of a voltage of a particular connector pin may be used by the load 120 to identify the power source 130 (see FIG. 1).

Referring to FIGS. 5A and 5B, at 510, the boot or initialization sequence starts. At 520, whether the power source is an SDP is determined. If the determination is in the affirmative, the flow goes to step A, which is the current limiting scheme for a 500 mA current limit specification. If the determination is in the negative, the flow goes to 530.

At 530, whether the power source is a CDP is determined. If the determination is in the affirmative, the flow goes to 532. At 532, whether the CDP comport to the USB 2.0 specification is determined. If the determination is in the affirmative, the flow goes to step A (the 500 mA current limiting scheme). If the determination is in the negative, the flow goes to step B, which is the current limiting scheme for a 1000 mA current limit specification. If the determination of 530 is in the negative, the flow goes to 540. At 540, whether the power source is a DCP is determined. If the determination is in the affirmative, the flow goes to step C, which is the current limiting scheme for a 1500 mA current limit specification.

Step A (500 mA current limit specification) includes steps 550, 552, 554, and 556. At 550, the processor applies a current limiting scheme for staying under 500 mA. In this exemplary embodiment, the load may select a current limiting scheme from a lookup table. Further details of the current limiting scheme lookup table are presented below in conjunction with FIG. At 552, the load reads the instantaneous peak current value from the power monitor circuit. At 554, the load may determine based on that value whether the current consumption of the wireless communication device is within the target 500 mA. If the determination is in the affirmative, the flow enters a loop at 552 to ensure the current consumption of the wireless communication device remains within budget. If the determination is negative, the flow goes back to step 550 to allow the load to apply additional current limiting scheme to reduce the current draw of the wireless communication device.

In the step A (500 mA current limit specification), the load does not need to wait for the $V_{MIN}$ INTERRUPT to deploy the current limiting scheme because the current capability of the power source is known. The 500 mA current limit provides little headroom for the wireless communication device. By not waiting for the $V_{MIN}$ INTERRUPT, any excess current drawn by the load may be addressed in a more timely fashion.

Step B (1000 mA current limit specification) and the step C (1500 mA current limit specification) include steps 560, 562, 564, and 566. Although the steps B and C share in same flow in the exemplary embodiment, that needs not be the case as would be understood by a person of ordinary skill in the art. At 560, the load enters a loop waiting for $V_{MIN}$ INTERRUPT. By waiting for the $V_{MIN}$ INTERRUPT, the load does not need to rely on the specifications of the power sources, and therefore, can provide a more accurate current limiting scheme. When the $V_{MIN}$ INTERRUPT is received, the flow goes to 562.

At 562, the load reads the instantaneous peak current value from the power monitor circuit. At 564, the load applies a current limiting scheme for staying under the maximum current. In this exemplary embodiment, the load may select a current limiting scheme from the current limiting scheme lookup table of FIG. 6. At 566, the load may determine whether the current consumption of the wireless communication device falls within the maximum current value. If the determination is in the affirmative, the flow enters a loop at 564 to ensure the current consumption of the wireless communication device remains within budget. If the determination is in the negative, the flow goes back to step 560 to repeat the process.

Figure 6:
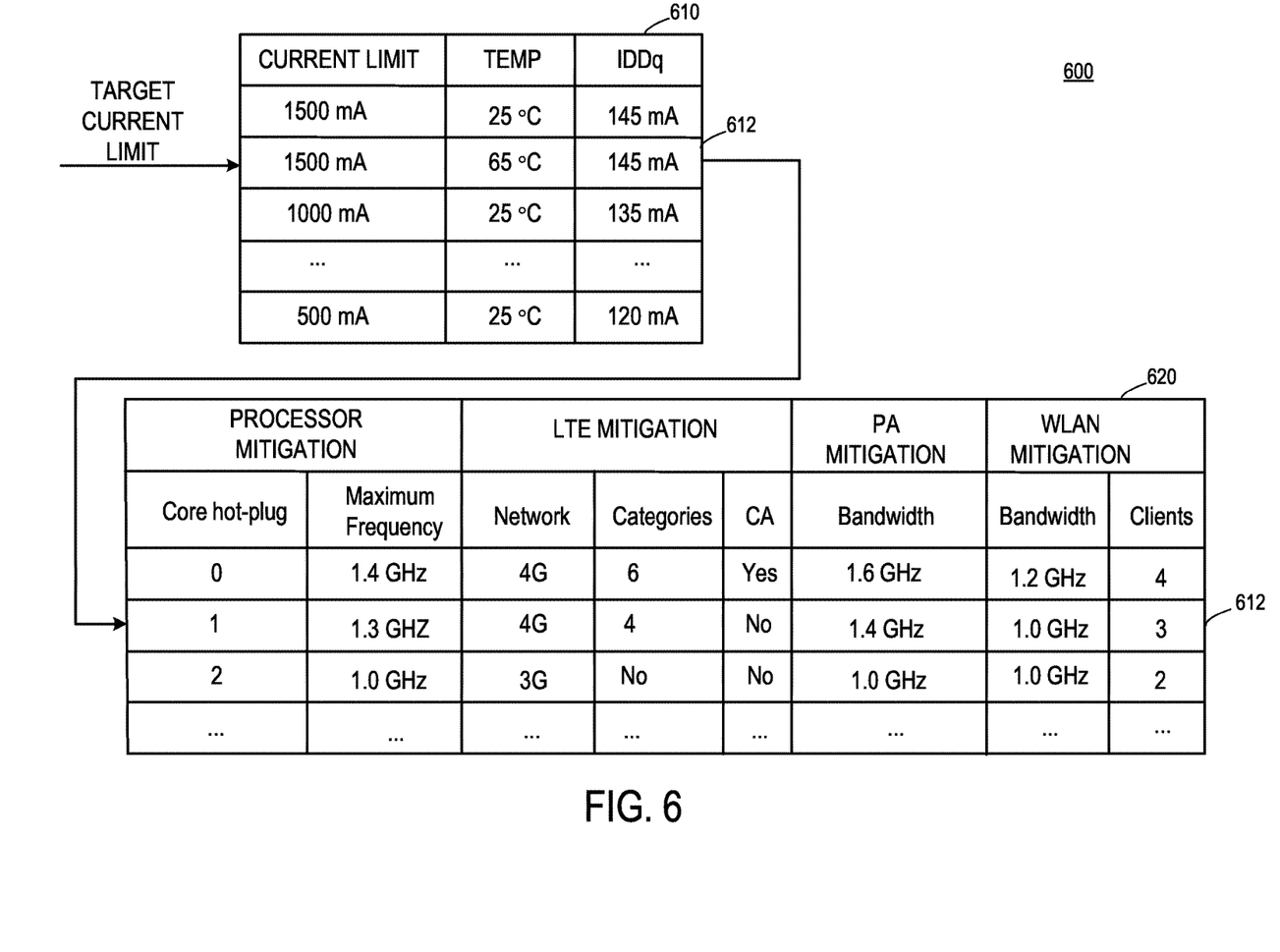
FIG. 6 is a diagram illustrating an exemplary embodiment of a current limiting scheme lookup table.

FIG. 6 is a diagram of an exemplary embodiment of a current limiting scheme lookup table. The current limiting scheme lookup table 600 stores multiple configurations of the load. The table 610 stores entries as a function of target current limitation, temperature, and/or leakage current information (IDDq). Thus, in one example, the load may select an entry 612 with a target current limit of 1500 mA, a temperature of 65° C., and an IDDq of 145 mA. The selected entry 612 may refer to entries of a table 620, where the entries of the table 620 may include various configurations of the wireless communication device meeting the target current of the entry 612.

The entries of a table 620 may include the load configurations to reduce a bandwidth, switch a communication mode, and/or reduce a range of wireless communication of the wireless communication device in order to reduce the current consumption. For example, the load configurations may include processor mitigation operations, which may include the number of cores to hot-plug and a maximum operating frequency limit. The load configurations may further include LTE mitigation operations, which may include the network (e.g., 4G or 3G), the LTE categories, and whether carrier aggregation (CA) is enabled. These LTE mitigation operations may affect the communication mode selected (e.g., 4G or 3G; LTE categories) and the throughput or bandwidth of the LTE communications. The load configurations may further include RF power amplifier mitigation operations, which may include various bandwidths to reduce power. These mitigation operations may affect the range and/or bandwidth of the amplifier. The load configurations may further include Wi-Fi mitigation operations such as various bandwidths and the number clients.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. For example, the steps may be implemented by circuits to perform the functions described herein and/or circuits generating the signals for the functions described herein, or combinations thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus, comprising:
    a load including a processor having a plurality of cores;
    a power management circuit configured to manage power supplied by a power source to the load and provide to the load one or more parameters relating to the power source, the one or more parameters comprising instantaneous peak current drawn from the power source and a voltage indicator responsive to voltage supplied by the power source to the load; and
    a power monitor circuit including:
    a current detector coupled to the power source;
    a voltage detector coupled to the power source; and
    a memory coupled to the current detector and the voltage detector, wherein the power monitor circuit generates the instantaneous peak current value and stores the instantaneous peak current value in the memory and wherein the power monitor circuit generates the voltage indicator, the voltage indicator comprising an interrupt, and
    wherein the load is dynamically configurable to operate within a current capability of the power source based on the one or more parameters and to apply one or more current limiting schemes to operate within the current capability of the power source, based on a type of the power source coupled to the power management circuit.

2. The apparatus of claim 1, wherein the load further comprises a wireless communication device.

3. The apparatus of claim 1, wherein the processor is further configured to apply the one or more current limiting schemes by varying at least one of operating voltage or operating frequency of the processor.

4. The apparatus of claim 1, wherein the load further comprises at least one amplifier and the processor is further configured to apply the one or more current limiting schemes by reducing power of the at least one amplifier.

5. The apparatus of claim 1, wherein the load further comprises a wireless transceiver and the processor is further configured to apply the one or more current limiting schemes by changing a communication mode of the wireless transceiver.

6. The apparatus of claim 1, wherein the load further comprises a wireless transceiver and the processor is further configured to apply the one or more current limiting schemes by reducing bandwidth of the wireless transceiver.

7. The apparatus of claim 1, further comprising a pin on a connector between the power source and the load, wherein the type of the power source is communicated through the pin on the connector.

8. An apparatus, comprising:
    a load including a processor having a plurality of cores;
    a power management circuit configured to manage power supplied by a power source to the load and provide to the load one or more parameters relating to the power source, the one or more parameters comprising instantaneous peak current drawn from the power source and a voltage indicator responsive to voltage supplied by the power source to the load; and
    a power monitor circuit including:
    a current detector coupled to the power source;
    a voltage detector coupled to the power source; and
    a memory coupled to the current detector and the voltage detector, wherein the power monitor circuit generates the instantaneous peak current value and stores the instantaneous peak current value in the memory and wherein the power monitor circuit generates the voltage indicator, the voltage indicator comprising an interrupt, and
    wherein the load is dynamically configurable to operate within a current capability of the power source by applying one or more current limiting schemes to operate within the current capability of the power source, based on a type of the power source coupled to the power management circuit.

9. The apparatus of claim 8, wherein the load further comprises a wireless communication device.

10. The apparatus of claim 8, wherein the load is configured to apply the one or more current limiting schemes based on the one or more parameters.

11. The apparatus of claim 8, wherein the processor is further configured to apply the one or more current limiting schemes by varying at least one of operating voltage or operating frequency of the processor.

12. The apparatus of claim 8, wherein the load further comprises at least one amplifier and the processor is further configured to apply the one or more current limiting schemes by reducing power of the at least one amplifier.

13. The apparatus of claim 8, wherein the load further comprises a wireless transceiver and the processor is further configured to apply the one or more current limiting schemes by changing a communication mode of the wireless transceiver.

14. The apparatus of claim 8, wherein the load further comprises a wireless transceiver and the processor is further configured to apply the one or more current limiting schemes by reducing bandwidth of the wireless transceiver.

15. An apparatus, comprising:
    a load including a processor having a plurality of cores;
    a power management circuit configured to manage power supplied by a power source to the load and provide to the load one or more parameters relating to the power source, the one or more parameters comprising instantaneous peak current drawn from the power source and a voltage indicator responsive to voltage supplied by the power source to the load; and a power monitor circuit including:

a current detector coupled to the power source;

a voltage detector coupled to the power source; and a memory coupled to the current detector and the voltage detector, wherein the power monitor circuit generates the instantaneous peak current value and stores the instantaneous peak current value in the memory and wherein the power monitor circuit generates the voltage indicator, the voltage indicator comprising an interrupt, and wherein the load is dynamically configurable to limit current drawn from the power source based on a current capability of the power source and to apply one or more current limiting schemes to operate within the current capability of the power source, based on a type of the power source coupled to the power management circuit.

16. The apparatus of claim 15, wherein the load further comprises a wireless communication device.

17. The apparatus of claim 15, wherein the load is configured to limit the current drawn from the power source based on the one or more parameters.

18. The apparatus of claim 15, wherein the processor is further configured to limit current drawn from the power source by varying at least one of operating voltage or operating frequency of the processor.

19. The apparatus of claim 15, wherein the load further comprises at least one amplifier and the processor is further configured to limit current drawn from the power source by reducing power of the at least one amplifier.

20. The apparatus of claim 15, wherein the load further comprises a wireless transceiver and the processor is further configured to limit current drawn from the power source by changing a communication mode of the wireless transceiver.

21. The apparatus of claim 15, wherein the load further comprises a wireless transceiver and the processor is further configured to limit current drawn from the power source by reducing bandwidth of the wireless transceiver.

* * * * *